(12) United States Patent
Jones et al.

(10) Patent No.: US 6,555,154 B2
(45) Date of Patent: Apr. 29, 2003

(54) METHOD AND APPARATUS FOR MAKING A POPCORN-SHAPED FROZEN PRODUCT

(75) Inventors: Stanley O. Jones, Vienna, IL (US); Curt D. Jones, Brentwood, TN (US)

(73) Assignee: Dippin' Dots, Inc., Paducah, KY (US)

( * ) Notice: Subject to any disclaimer, the term of this patent is extended or adjusted under 35 U.S.C. 154(b) by 0 days.

(21) Appl. No.: 10/077,058

(22) Filed: Feb. 15, 2002

(65) Prior Publication Data

US 2002/0144608 A1 Oct. 10, 2002

Related U.S. Application Data

(60) Provisional application No. 60/282,325, filed on Apr. 6, 2001.

(51) Int. Cl.[7] .............................. F25C 1/00; F25D 17/00
(52) U.S. Cl. ............................... 426/524; 62/64; 62/74; 62/373
(58) Field of Search .............................. 426/524; 62/64, 62/67, 74, 373, 374, 375, 376; 264/14, 28

(56) References Cited

U.S. PATENT DOCUMENTS

| | | | |
|---|---|---|---|
| 4,009,740 A | 3/1977 | Michielli | 141/172 |
| 4,509,339 A | 4/1985 | Mehlan et al. | 62/450 |
| 4,730,750 A | 3/1988 | Ficken | 221/124 |
| 4,741,178 A | 5/1988 | Fujiu et al. | 62/525 |
| 4,831,841 A | 5/1989 | Falk | 62/381 |
| 4,920,764 A | 5/1990 | Martin | 62/259 |
| 5,027,698 A | 7/1991 | Chirnomas | 99/450 |
| 5,121,854 A | 6/1992 | Trouteaud et al. | 221/15 |
| 5,224,415 A | 7/1993 | McFadden et al. | 99/357 |
| 5,281,429 A | 1/1994 | Zevlakis | 426/389 |
| 5,305,615 A | 4/1994 | McFadden et al. | 62/378 |
| 5,319,939 A | 6/1994 | McFadden et al. | 62/63 |
| 5,400,614 A | 3/1995 | Feola | 62/233 |
| 5,405,054 A | 4/1995 | Thomas | 222/95 |
| 5,417,081 A | 5/1995 | Rudick et al. | 62/440 |
| 5,421,484 A | 6/1995 | Beach | 222/95 |
| 5,463,878 A | 11/1995 | Parekh et al. | 62/394 |
| 5,557,944 A | 9/1996 | Hirano et al. | 62/469 |
| 5,704,216 A | 1/1998 | Hirano et al. | 62/114 |
| 5,718,119 A | 2/1998 | Wakita et al. | 62/85 |
| 5,772,072 A | 6/1998 | Prescott et al. | 221/121 |
| 5,842,349 A | 12/1998 | Wakita et al. | 62/85 |
| 6,209,329 B1 * | 4/2001 | Jones et al. | 62/64 |

FOREIGN PATENT DOCUMENTS

CA 964621 3/1975 .................. 99/148

* cited by examiner

*Primary Examiner*—George C. Yeung
(74) *Attorney, Agent, or Firm*—Thomas, Kayden, Horstemeyer & Risley

(57) ABSTRACT

The present invention is directed to a novel method for manufacturing popcorn-shaped frozen product, such as but not limited to ice cream. Unlike prior systems that manufactured small, beaded frozen product, the method of the present invention introduces a much larger (diametrically larger) quantity of liquid composition into the liquid refrigerant. By introducing a sufficiently large quantity of liquid composition into the liquid refrigerant, the freezing processes changes substantially, to give the final product a popcorn shape.

18 Claims, 6 Drawing Sheets

METHOD AND APPARATUS FOR MAKING A POPCORN-SHAPED FROZEN PRODUCT

CROSS-REFERENCE TO RELATED APPLICATIONS

The present application claims the benefit of U.S. provisional application serial No. 60/282,325, filed on Apr. 6, 2001, entitled "Method for Manufacturing Popcorn-Shaped Ice Cream," the full disclosure of which is hereby incorporated by reference.

FIELD OF THE INVENTION

The present invention relates generally to methods for preparing ice cream, and more particularly to a method for preparing popcorn-shaped ice cream.

DESCRIPTION OF THE PRIOR ART

Sales of ice cream and frozen yogurt products have risen dramatically in recent years, and applicants herein have captured a portion of this product market through the development of a unique novelty ice cream, frozen yogurt and ice product in the form of beads. This product, marketed under the trademarks "Dippin' Dots®" and "Ice Cream of the Future®", has become very popular in specialty stores, at fairs and theme parks, and through vending machines.

Applicants have proprietary rights in the method of preparing and storing the product pursuant to U.S. Pat. No. 5,126,156, issued Jun. 30, 1992, herein incorporated by reference, as well as rights associated with improvements pursuant to U.S. Pat. No. 5,664,422, issued Sep. 9, 1997, and U.S. Pat. No. 6,000,229, issued Dec. 14, 1999, herein incorporated by reference. As is generally described therein, the patented method involves delivering flavored liquid dairy and other alimentary compositions to a feed tray and then dripping the composition into a freezing chamber. The feed tray comprises a plurality of orifices through which liquid composition passes to fall into the freezing chamber, either in the form of droplets or liquid streams, which streams break into droplets before freezing. Each orifice may also have a corresponding feed dropper, which is downwardly disposed in relation to the tray such that the liquid composition passes from the tray through an orifice and then through an associated feed dropper where a droplet or liquid stream is formed. The orifices or combination of orifices and feed droppers will hereinafter be referred to collectively as feed assemblies.

The falling droplets of liquid composition freeze rapidly (i.e., flash freeze) in the freezing chamber due to the presence of both gaseous and liquid refrigerant in the area between the orifices and the bottom of the freezing chamber, thereby forming solid beads of flavored ice cream, yogurt or other alimentary products, such as flavored ice. More specifically, as droplets of liquid free fall through a gaseous region of the freezing chamber, and before the droplets contact the liquid refrigerant, the outer spheres of the droplets form a thin frozen shell. This thin frozen shell serves to protect the spherical shape of the droplets as they impact the surface of the liquid refrigerant. The remainder of the droplets freeze completely as they pass through the liquid refrigerant, and before reaching the bottom of the freezing chamber. The frozen beads are removed from the freezing chamber and packed for distribution and later consumption.

While the free-flowing, beaded ice cream that is prepared through the above-described flash-freezing process has enjoyed wide-spread popularity and success, it is believed that other unique shapes of ice cream product may enjoy similar demand and success.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. In the drawings.

SUMMARY OF THE INVENTION

Figure 1:
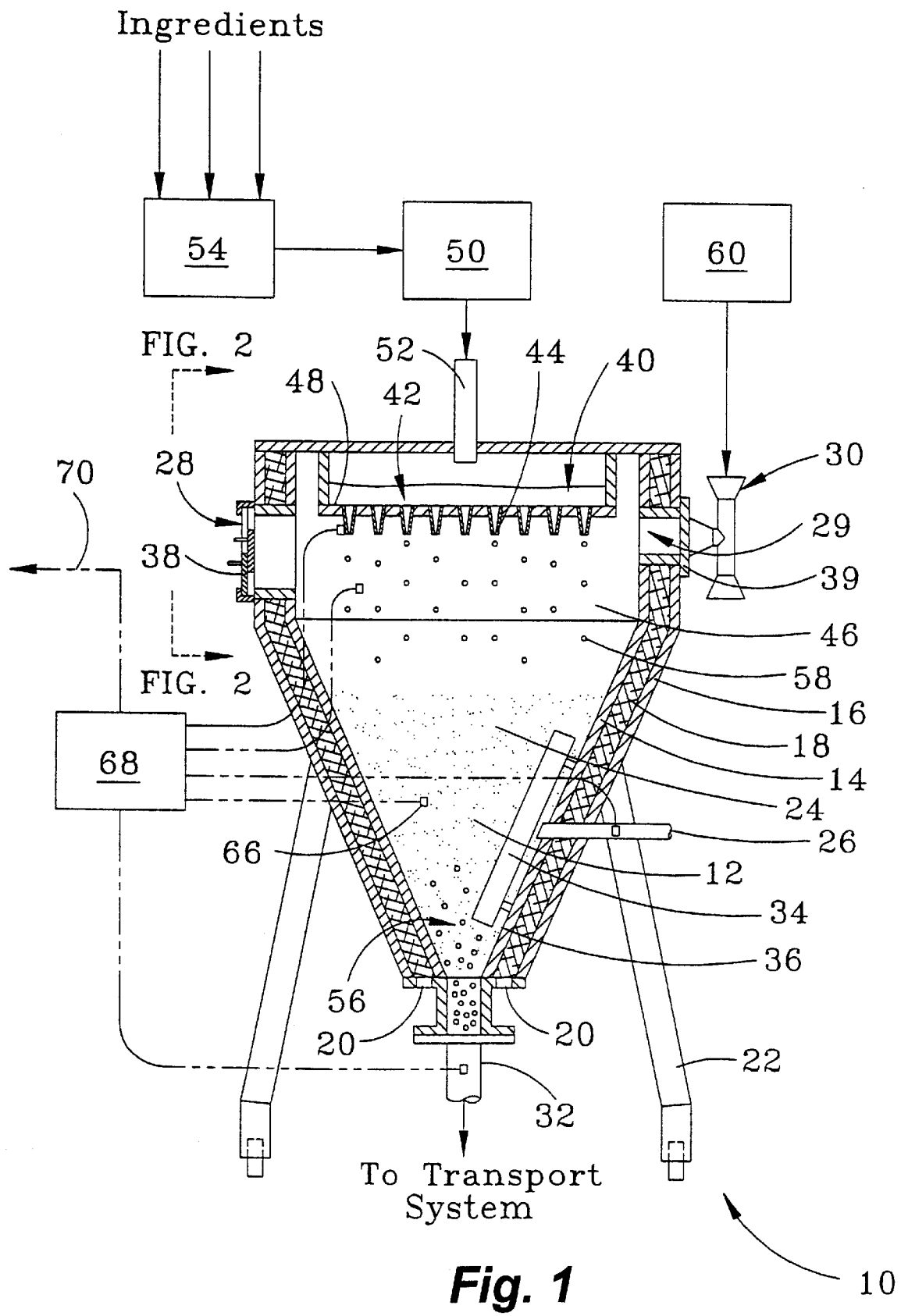
FIG. 1 is a cross-sectional elevation of a cryogenic processor that may be used to prepare popcorn-shaped frozen product.

The present invention is directed to a novel method for manufacturing popcorn-shaped frozen product, such as but not limited to ice cream. Unlike prior systems that manufactured small, beaded frozen product, the method of the present invention introduces a much larger (diametrically larger) quantity of liquid composition into the liquid refrigerant. By introducing a sufficiently large quantity of liquid composition into the liquid refrigerant, the freezing processes changes substantially, to give the final product a popcorn shape.

In this regard, unlike the freezing of small beads, large quantities of liquid composition introduced into the liquid refrigerant crust freeze (i.e., flash freeze an outer shell). It is believed that the popcorn shape is achieved because of the presence of water within the liquid composition mixture, such that as the temperature of the interior approaches freezing, it expands, causing it to rupture or burst through the outer frozen shell. This process creates the unique popcorn shape of the final, frozen product. It should be appreciated that the frozen product, in one embodiment, is ice cream. In other embodiments, however, the frozen product may be sherbet, flavored ice, or other frozen product.

DETAILED DESCRIPTION OF THE PREFERRED EMBODIMENT

Having summarized various aspects of the preferred embodiment, reference will now be made in detail to the description of the invention as illustrated in the drawings.

While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Reference is now made to FIG. 1 showing an improved cryogenic processor constructed in accordance with an embodiment of the present invention to produce free-flowing frozen product in the form of popcorn-shaped pieces. The high-level method utilized to produce the flash-frozen product is described in detail in U.S. Pat. Nos. 5,126,156, 5,664,422, and 6,000,229, and will be summarized below in order to facilitate an understanding of the unique production process of the present invention.

In this regard, cryogenic processor 10 includes a freezing chamber 12 that is most preferably in the form of a conical tank that holds a liquid refrigerant therein. The freezing chamber 12 incorporates an inner shell 14 and an outer shell 16. Insulation 18 is disposed between the inner shell 14 and outer shell 16 in order to increase the thermal efficiency of the chamber 12. The freezing chamber 12, as shown in FIG. 1, is a free-standing unit supported by legs 22. Alternatively, the freezing chamber 12 may be disposed in a frame that is specially built to support the processor 10 while in use.

Refrigerant 24, preferably liquid nitrogen in view of its known freezing capabilities, enters the freezing chamber 12 by means of refrigerant inlet 26. Refrigerant 24 entering chamber 12 through inlet 26 is used to maintain a predetermined level of liquid refrigerant in the freezing chamber and must be added to replace refrigerant 24 that is lost by evaporation or by other means incidental to production. Gaseous refrigerant that has evaporated from the surface of the liquid refrigerant 24 in freezing chamber 12 primarily vents to the atmosphere through exit port 29 which cooperates with the vacuum assembly 30, which can be in the form of a venturi nozzle. Extraction of the frozen product occurs through product outlet 32 adapted at the base of the freezing chamber 12.

When incoming refrigerant 24 enters the freezing chamber 12 through inlet 26, a swirling or cyclonic motion of refrigerant 24 may form in the freezing chamber 12 depending on the amount of refrigerant 24 allowed to enter through inlet 26 and the flow velocity of the incoming refrigerant 24. This cyclonic motion may not be favorable to the production process because the frozen pieces awaiting extraction at the bottom of freezing chamber 12 may be swept into the swirling refrigerant and thus prevented them from falling to the bottom of the freezing chamber for collection. Such unwanted cyclonic motion of the incoming refrigerant may be prevented by baffles 34 mounted to interior surface 36 of inner shell 14. Baffles 34 extend inwardly from interior surface 36 in the vicinity of the refrigerant inlet 26. Additionally, the baffles 34 are oriented so that their lengths are substantially vertical within the freezing chamber 12.

An ambient air inlet port 28 with adjustment doors 38 and exit port 29 with adjustment doors 39 are provided to adjust the level of gaseous refrigerant which evaporates from the surface of the liquid refrigerant 24 so that excessive pressure is not built up within the processor 10 and freezing of the liquid composition in the feed assembly 40 does not occur.

In one embodiment, a feed tray 48 may receive liquid composition from a delivery source 50. Typically, a pump (not shown) drives the liquid composition through a delivery tube 52 into the feed tray 48. A premixing device 54 allows several compositions, not all of which must be liquid, such as powdered flavorings or other additives of a size small enough not to cause clogging in the feed assembly 40, to be mixed in predetermined concentrations for delivery to the feed tray 48.

In one embodiment, the feed tray 48 may be designed with feed assembly 40 that forms droplets 58 of the desired character. Previous systems used dropper assemblies having a relatively small orifice, in order to form uniformly-sized beads of frozen product. However, the present invention operates by introducing a much larger (diametrically larger) flow of liquid composition into the liquid refrigerant. Therefore, if dropper elements are used, the size of the dropper elements will be much larger than in prior devices.

Alternatively, the feed tray 48 may simply have a plurality of large orifices in the bottom in order to allow relatively large flows of liquid composition into the freezing chamber.

Figure 4:
FIG. 4 is a perspective view of a single serving (in a transparent cup) of popcorn-shaped frozen product, manufactured by the apparatus and method of the present invention.

After the popcorn-shaped pieces 56 are formed, they fall to the bottom of chamber 12. A transport system connects to the bottom of chamber 12 at outlet 32 to carry the pieces 56 to a packaging and distribution network for later delivery and consumption. For simplicity, the pieces 56 have been illustrated in FIG. 1 as small dots. However, in reality they are relatively large popcorn-shaped pieces. In this regard, FIGS. 3 and 4 are drawings of a popcorn-shaped frozen product manufactured in accordance with the present invention. The pieces preferably range from about ½ inch to 1 inch in diameter.

In accordance with one aspect of the system, the processor may be designed with an incorporated vacuum assembly 30 which can take the form of a venturi. The vacuum assembly 30 cooperates with air inlet 28 and adjustment doors 38 so that an ambient airflow passes through the inlet 28 and around feed assembly 40 to ensure that no liquid composition freezes therein. This is accomplished by mounting the vacuum assembly 30 and air inlet 28 on opposing sides of the gas diffusion chamber 46 such that the incoming ambient air drawn by the vacuum assembly 30 is aligned with the feed assembly. In this configuration, ambient air flows around the feed assembly warming it to a sufficient temperature to inhibit the formation of frozen liquid composition in the feed assembly flow channels. Air source 60, typically in the form of an air compressor, is attached to vacuum assembly 30 to provide appropriate suction to create the ambient air flow required.

As mentioned above, air inlet 28 incorporates adjustment doors 38 for controlling the amount of incoming ambient air. The preferred embodiment of the doors 38 is a series of slidable door segments mounted within a frame. This configuration accommodates numerous adjustment combinations so that the desired flow rates may be achieved between a full open setting where the doors 38 expose a maximum size inlet opening and a full closed setting where the doors completely block the inlet 28, thereby preventing ambient air flow. It should be recognized by those of ordinary skill in the art that numerous other embodiments of the inlet doors 38 may be used for achieving the desired results, i.e. a variable flow nozzle, or an adjustable inlet vent, to mention but a few.

In one embodiment, the doors are manually adjusted. An operator outside the processor 10 may adjust the position of the doors based upon observations, experience, or other factors. In another embodiment, the doors may be automatically adjusted by a motor, or other mechanism capable of moving the doors. In such an embodiment, temperature sensors (or other appropriate sensors) may be utilized to sense the temperature surrounding the feed assembly 40. As the temperature falls below a predetermined temperature the motor could adjust the doors to increase the size of the inlet 28. Conversely, as the temperature rises above a predetermined temperature, the motor could adjust the doors to decrease the size of the inlet 28.

In yet another embodiment, the inlet 28 may be held constant and the vacuum source 60 may be adjusted to control the temperature surrounding the feed assembly 40. In such an embodiment, as the temperature falls below a predetermined level, the vacuum source 60 may be controlled to increase the air flow. Conversely, as the temperature rises above a predetermine temperature, the vacuum source 60 may be controlled to decrease the air flow.

Further still, the temperature surrounding the feed assembly 40 may be controlled through a controlled combination of the inlet 28 size and the rate of air flow across the droppers 44. That is, temperature control may be implemented through a combination of motor control and vacuum source 60 control.

In yet another embodiment, the motor control and/or the vacuum source 60 control may be based upon the rate of flow liquid composition into the feed assembly. Liquid level sensors may be utilized to sense the level of liquid composition within the feed assembly.

Several sensors 66 may be incorporated to measure numerous operating values, such as freezing chamber temperature, refrigerant level, etc. These sensors each provide an input signal to control device 68 which monitors the production process and provides control output signals 70 to facilitate automatic production of the frozen beads. For purposes of illustration, these sensors have been included in FIG. 1 simply as dots. It will be appreciated, however, that the actual structure of the sensors will vary in accordance with the actual implementation.

In accordance with yet another aspect of the illustrated embodiment, the thermal characteristics of the processor 10 are improved. Preferably, the processor 10 is constructed with a double-wall construction, having an inner wall 14 and an outer wall 16. Previous generation processors have included foam glass insulation between the walls 14 and 16. However, in accordance with one aspect of the invention, a vacuum jacket is instituted to insulate the liquid refrigerant within the processor 10. Accordingly a port (not shown) and vacuum source (not shown) may be provided to evacuate the chamber between the inner wall 14 and outer wall 16. It has been found that such a "vacuum jacket" provides better insulating quality than a foam glass jacket. As a result, the rate at which the liquid refrigerant vaporizes and evaporates is reduced. Thus, a smaller amount of liquid refrigerant is required for the preparation of a given amount of frozen product.

Figure 2:
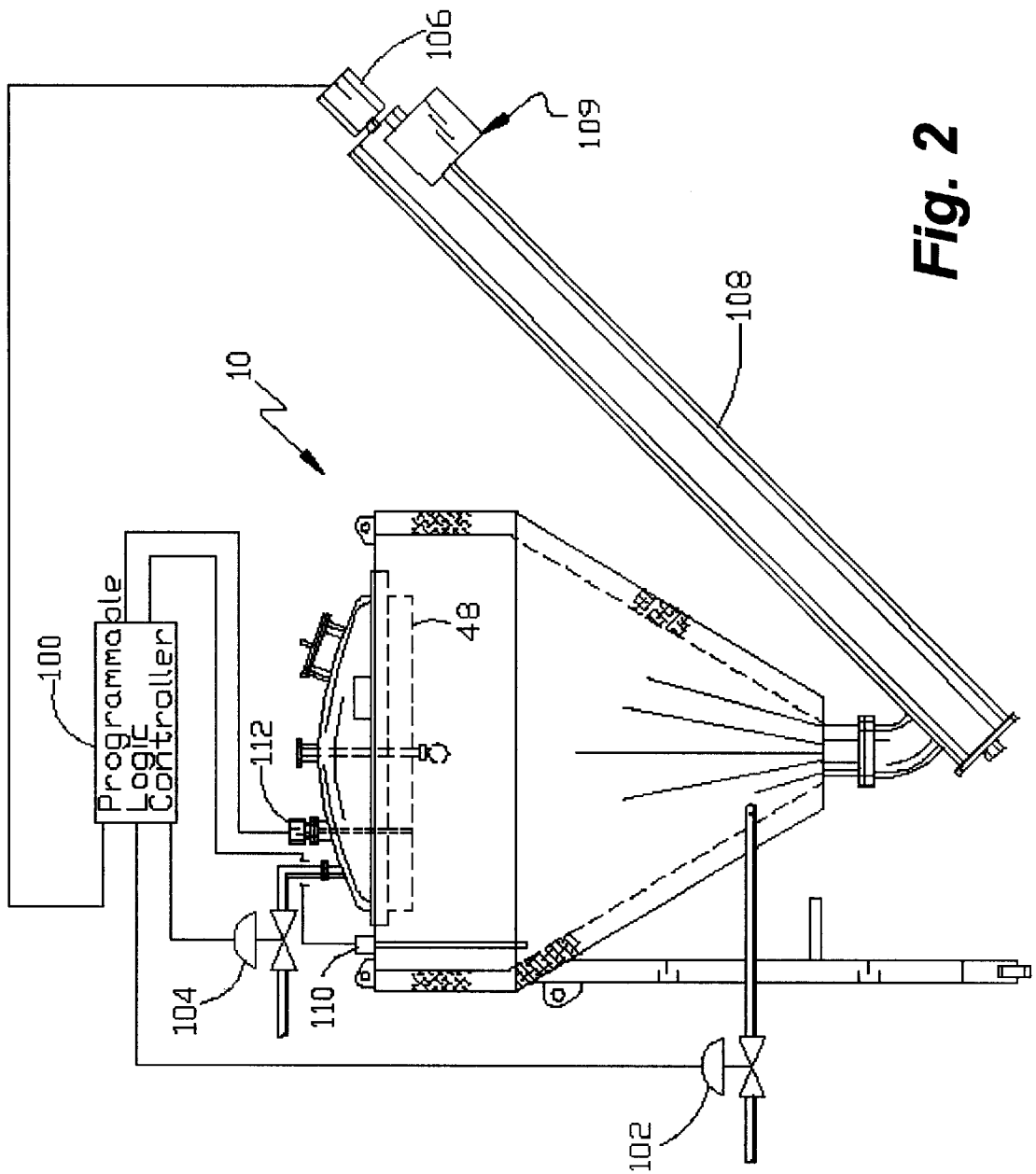
FIG. 2 is a diagram of the improved cryogenic processor illustrating various features and aspects of the cryogenic process or and transport assembly.
Figure 3A:
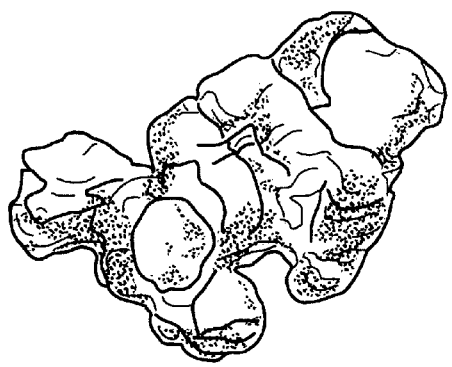
FIGS. 3A through 3G are drawings illustrating various possible shapes of a single kernel of the popcorn-shaped frozen product manufactured by the apparatus and method of the present invention.
Figure 3B:
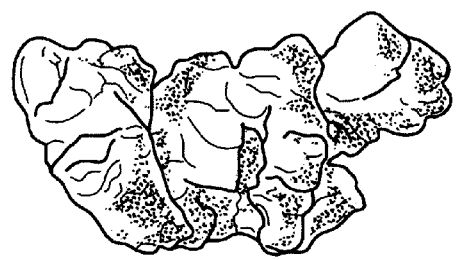
Figure 3C:
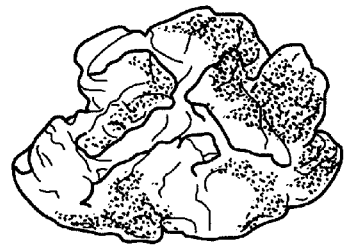
Figure 3D:
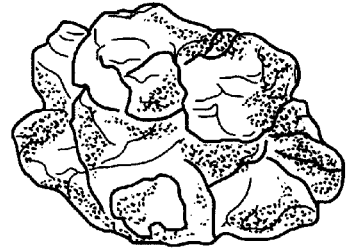
Figure 3E:
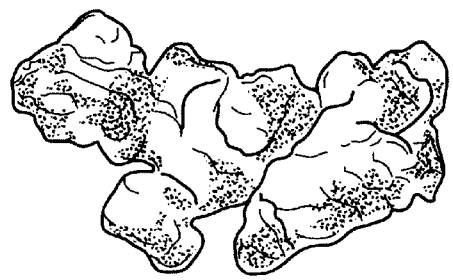
Figure 3F:
Figure 3G:
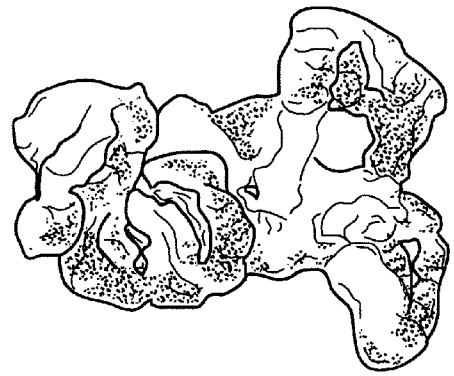

The cryogenic processor 10 also includes a control system for controlling the operation of the cryogenic processor described above. In this regard, reference is made to FIG. 2. FIG. 2 is a diagram of the cryogenic processor 10 showing various control valves. For simplicity, some of the details of the cryogenic processor illustrated in FIG. 1 have been eliminated from the diagram of FIG. 2.

Method of the Present Invention

Having described the general components and features of a cryogenic processor system, reference will now be made to the method of the present invention: namely, and method for manufacturing popcorn-shaped ice cream. In this regard, the general architecture of the prior system may be utilized in performing the method of the present invention. However, are least one fundamental difference is implemented. In prior systems, it was important to regulate the introduction of the liquid composition through the dropper assemblies and into the liquid refrigerant to obtain small, uniformly sized beads.

In the present invention, however, the method seeks to introduce a much larger (diametrically larger) quantity of liquid composition into the liquid refrigerant. One manner of doing this is to provide a feed tray having much larger orifices, allowing multiple streams of liquid composition to pour into the liquid refrigerant. By introducing a sufficiently large quantity of liquid composition into the liquid refrigerant, the freezing processes changes substantially, to give the final product the popcorn-shape shown in FIG. 5.

In this regard, unlike the freezing of small beads, large quantities of liquid composition introduced into the liquid refrigerant crust freeze (i.e., flash freeze an outer shell). It is believed that, due to the presence of water within the liquid composition mixture, as the temperature of the interior approaches freezing, it expands, causing it to burst through the outer frozen shell. This process creates the unique popcorn shape of the final, frozen product.

As an alternative to pouring streams of liquid composition through large orifices in the feed tray, the composition could be forced through a flexible tube through a peristaltic pump. The structure and operation of peristaltic pumps are well known in various industries, and therefore need not be described herein.

Reference is now made to FIGS. 3A through 3G, which illustrate various "popcorn" shapes of product that may result through production using a system and method of the present invention. As can be readily observed from these drawings, like popcorn, the various kernels of frozen product generated by the system and method of the present invention may have widely varying shapes. Reference is made briefly to FIG. 4, which illustrates a single serving of frozen product, manufactured in accordance with the invention herein. In this regard, the product may be a served in a transparent cup (or other container).

Figure 5:
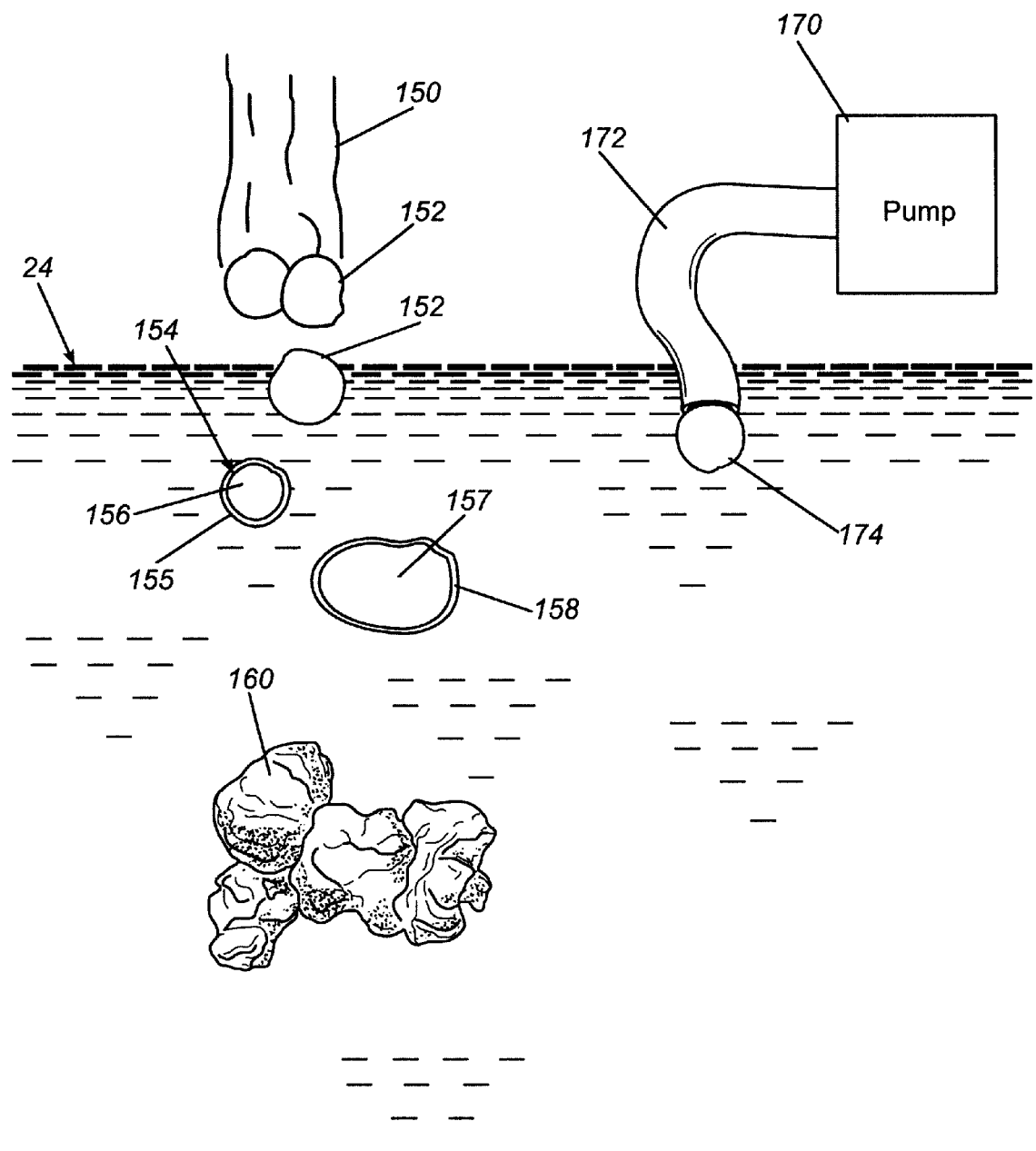
FIG. 5 is a diagram illustrating the freezing process which results in the unique popcorn shape of the frozen product of the present invention.

Reference is made now to FIG. 5, which is a diagram illustrating the manner in which the popcorn-shaped frozen product is created. It should be understood, however, that the presentation of FIG. 5 is intended only to be illustrative of the process, and should not be construed literally or overly restrictive. In this regard, in one embodiment of the invention, liquid composition is discharged through orifices provided in the bottom of a feed tray. As the liquid composition passes through the orifices, it may pass through in the form of droplets, or more likely a continuous stream 150. As the liquid composition free falls in the space interposed between the feed tray 48 and the liquid refrigerant, it begins to break apart, particularly as it nears the surface of the liquid refrigerant 24. This is illustrated in FIG. 5 by globules 152 that are forming from the stream 150 of liquid composition, just prior to impact on the liquid refrigerant 24.

The cryogenic processors of prior art systems have been designed such that the droplets of liquid composition that are introduced into the liquid refrigerant 24 are small, whereas the processor in the present invention introduces larger globules of liquid composition 152 into the liquid refrigerant 24. Introducing larger globules alters the freezing process in a manner that results in popcorn-shaped product.

We hypothesize that the mechanism by which introducing larger globules creates popcorn-shaped product involves the freezing characteristics of water, a major constituent of the liquid composition. It is well known that water expands when frozen, and that the degree of expansion is inversely related to the rate of freezing. When the droplets of liquid composition are small, it is believed that the entire droplet freezes quickly, limiting the expansion of the water in the composition. There is no significant difference between the rate of freezing of the inner and outer droplet. In contrast, when the composition is introduced to the liquid refrigerant as larger globules 154, a significant differential between the rate of freezing of the exterior and interior portions of the globule is believed to be created. Being in direct contact with the liquid refrigerant, the outer globule is thought to reach a frozen state before the inner globule, creating an outer shell 155 of frozen composition surrounding the inner liquid composition. Thereafter, the inner liquid composition 157 is believed to continue to expand as it freezes more slowly than the outer portion. Ultimately, the pressure due to the expansion of the inner liquid composition causes one or more locations of the outer shell 158 to rupture, such that the liquid composition from the interior space of the globule bursts through the outer shell 158. As this occurs, the freezing process completes to form a solid frozen product with a unique popcorn-shape 160.

As is known, the density of the liquid composition and frozen product is greater than that of the liquid refrigerant. Therefore, the frozen product continues to fall, via gravity, through the liquid refrigerant 24 and ultimately to the bottom of the freezing chamber, where it is collected for packaging and distribution.

It has been found that the system and method of the present invention produce frozen product of a variety of shapes and sizes. Therefore, prior to packaging for shipment and distribution, additional steps and equipment may be utilized to separate and/or segregate the frozen product by size and/or shape. In this regard, the product may be passed successively through gratings or sieves having differing sized openings (e.g., progressively smaller), such that the largest pieces may be filtered out in a first step, and subsequent sifting or grating steps may be performed to successively filter out smaller and smaller product sizes.

As previously mentioned, one embodiment of the present invention may introduce liquid composition into the liquid refrigerant 24 by passing the liquid composition through a feed tray 48 that is disposed approximately 18–22 inches above a top surface of the liquid refrigerant 24. As gravity causes the liquid composition to stream through the orifices of the feed tray 48, and free fall through ambient space overlying the liquid refrigerant 24, the liquid composition atomizes or particulates into distinct globules that then pass through the liquid refrigerant 24. It should be appreciated, however, that alternative methods and apparatus may be employed to introduce the liquid composition into the liquid refrigerant 24. For example, in one embodiment a peristaltic pump 170 may be utilized to pump liquid composition through a flexible tube 172 that introduces globules 174 into the liquid refrigerant 24. Consistent with the scope and spirit of the present invention, yet other methods may also be used to introduce liquid composition into the liquid refrigerant 24.

Figure 6:
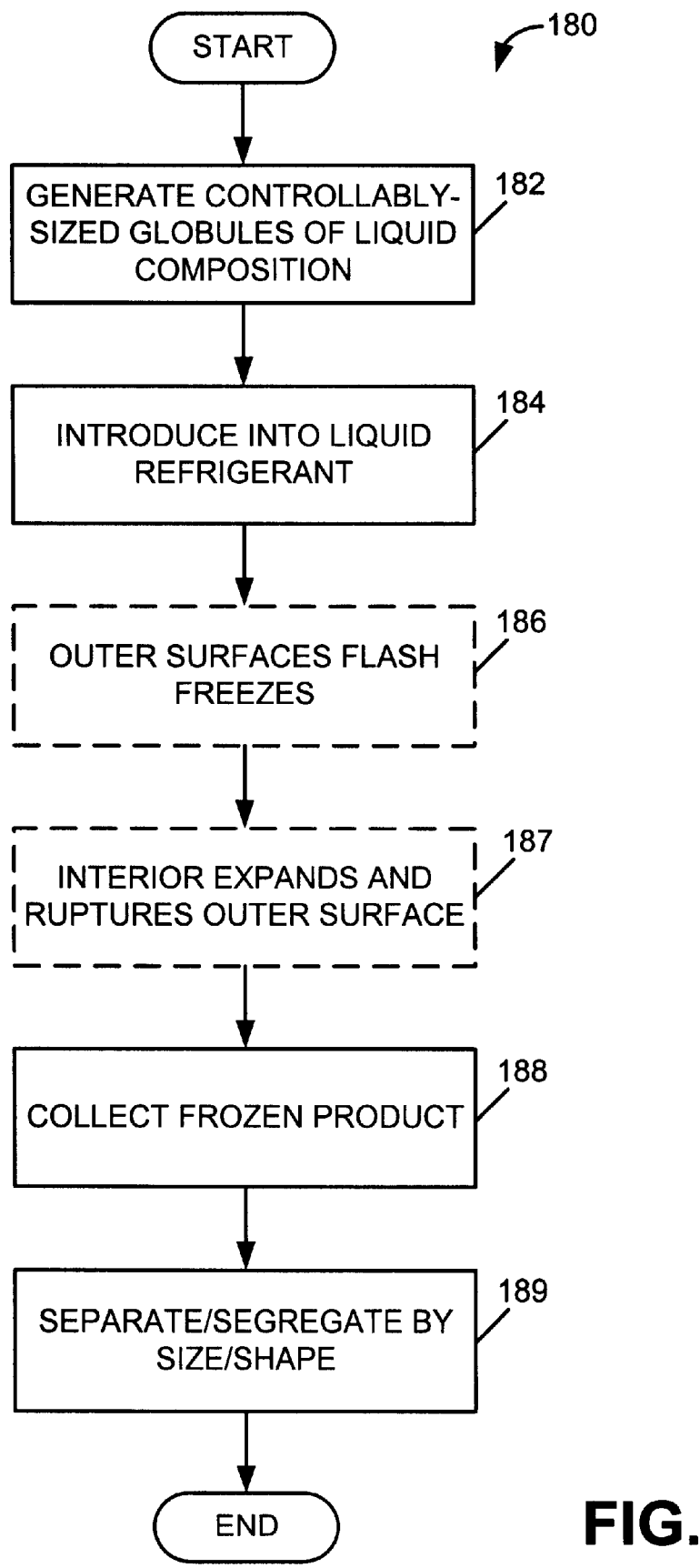
FIG. 6 is a flowchart illustrating the top level operation of a method constructed in accordance with the invention.

Reference is now made to FIG. 6, which is a flowchart 180 illustrating the top-level method steps carried out in accordance with one embodiment of the present invention. In this regard, a first step is to generate controllably-sized globules of liquid composition 182. As previously described, globules may be generated by passing liquid composition through orifices in the bottom of a feed tray 48. The globules may be controllably sized by controllably sizing the orifices in the bottom of the feed tray 48. In accordance with one embodiment in the present invention, orifices having a diameter of approximately 7/64 of an inch generate popcorn-shaped frozen product having diameter ranging from approximately ½ to 1 inch. In accordance with another embodiment in the present invention, a peristaltic pump may be utilized in the size of the globules of liquid composition may be controlled by the diameter of the flexible tubing used to pass the liquid composition through.

Thereafter, the liquid composition is introduced into the liquid refrigerant (e.g., liquid nitrogen) (step 184). Almost instantaneously upon introduction of the globules of liquid composition into the liquid refrigerant, the outer surface of the globules flash freeze, to form a shell or crust encircling a substantially liquid interior space. As the globules free fall through the liquid refrigerant, the liquid within the interior of the globules falls in temperature. As the temperature of the interior liquid approaches freezing, it expands due to the water content within the liquid composition. Due to these expansion pressures applied against the frozen outer shell, the frozen shell ultimately ruptures or bursts causing a substantial distortion in the once-beaded shape of the product. Indeed, this distorted shape, which is generated by this rupturing/freezing process, closely resembles the shape of popcorn kernels.

The frozen product continues to free fall through the liquid refrigerant fully solidifying before reaching the bottom of the freezing chamber. Thereafter, the frozen product may be collected from the bottom of the freezing chamber using a transport or delivery system, such as that illustrated in FIG. 2 (step 188). Thereafter, the frozen product may be packaged for shipping. Alternatively, and in connection with one embodiment, the frozen product may be separated or segregated by size. In this regard, it has been found that the product generated from the system and method described herein results in a frozen product pieces having a variety of sizes and shapes. By passing the frozen product through a sieve having a relatively large or course granularity, the largest pieces of frozen product may be separated out from the remainder of the product. These larger pieces may be separately packaged for shipping. Thereafter, successive sifting or filtering steps may be implemented to successively separate out smaller and smaller pieces of the product. Alternatively, the product may be packaged and shipped with pieces of mixed sizes and shapes.

Empirical Data

Utilizing the system and method described above, various product runs were executed under slightly different conditions. The following summarizes empirical data from some of these test runs of the above-described process.

In a first test run, a gallon of liquid composition was run through the feed tray 48 in just under three minutes, to produce a total weight of 81.8 ounces of popcorn-shaped product. The larger pieces comprise about 20% of the total, or about 15.3 ounces.

In a second test run, a gallon liquid composition was run through in just under two minutes, to produce a total weight of 70.7 ounces. The larger pieces comprised about 14% of the total of this run, or about 10.2 ounces.

In another test run of the system described above, the orifice size of the feed trays were modified to 7/64 of an inch and a sample of 500 milliliters of liquid ice cream mix was poured through the orifice tray. The mix was run through the tray at a level of 1-inch depth in the tray. This product run resulted in frozen product that was approximately 5% chunks and split beads, 10% small popcorn-shaped pieces, 25% beads approximately 2 millimeters in diameter, 25% beads approximately 4 millimeters in diameter, and 35% beads approximately 8–12 millimeters in diameter.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for producing a popcorn-shaped frozen product comprising:

a freezing chamber containing liquid refrigerant;

a feed tray overlying the freezing chamber and configured to receive liquid composition from a delivery source to produce a popcorn-shaped frozen product, the tray having a plurality of orifices for regulating discharge of liquid composition from the tray, the orifices being approximately 7/64 of an inch in diameter, and the feed tray being spaced approximately 18 to 22 inches above a surface of the liquid refrigerant in the freezing chamber.

2. The apparatus as defined in claim 1, wherein the feed tray further includes droppers that depend from the orifices, such that the liquid composition is delivered to the freezing chamber through the droppers.

3. The apparatus as defined in claim 2, wherein the droppers are tapered.

4. The apparatus as defined in claim 1, wherein the freezing chamber is frusto-conically shaped.

5. The apparatus as defined in claim 1, further including a delivery source capable of providing liquid composition to the feed tray.

6. A method of producing a popcorn-shaped frozen product comprising:

controllably sizing globules of a liquid composition of the product to be frozen; and introducing the controllably-sized globules into a liquid refrigerant that is cold enough substantially flash-freeze an outer surface of the controllably-sized globules, such that an inner portion will burst through the frozen outer surface upon expansion as the inner portion approaches a freezing temperature to produce a popcorn-shaped frozen product.

7. The method as defined in claim 6, wherein the step of controllably sizing globules further includes providing a feed tray with orifices approximately 7/64 of an inch in diameter.

8. The method as defined in claim 7, wherein the step of introducing the controllably-sized globules into the liquid refrigerant includes disposing the feed tray over a chamber containing the liquid refrigerant, introducing the liquid composition into the feed tray, and allowing the liquid composition to fall by gravity through the orifices.

9. The method as defined in claim 8, wherein the step of disposing the feed tray over a chamber containing the liquid refrigerant further includes disposing the feed tray approximately 18 to 22 inches above a surface of the liquid refrigerant.

10. The method as defined in claim 6, wherein the frozen product is ice cream.

11. The method as defined in claim 6, wherein the step of introducing the controllably-sized globules into the liquid refrigerant includes forcing the liquid composition through a flexible tube using a peristaltic pump.

12. The method as defined in claim 11, wherein the flexible tube is sized so that the liquid composition of the product to be frozen freezes an outer surface before an interior portion freezes, and so that the inner portion will sufficiently expand prior to freezing to burst through the frozen outer surface.

13. The method as defined in claim 6, further including the step of collecting frozen product after the frozen product has passed through the freezing chamber, and separating frozen product based upon diametric size.

14. A method of producing a popcorn-shaped frozen product comprising:

introducing a plurality of globules of a liquid composition to be frozen into the frozen product into a liquid refrigerant;

freezing an outer surface of the globules;

after freezing the outer surface, causing expansion of the liquid composition that is inside the frozen outer surface, so that the expansion of the liquid composition bursts through the frozen outer surface to produce a popcorn-shaped frozen product.

15. The method as defined in claim 14, wherein the step of causing expansion includes reducing a temperature of the liquid composition that is inside the frozen outer surface to a temperature near freezing.

16. The method as defined in claim 14, wherein the step of introducing the globules into the liquid refrigerant includes forcing the liquid composition through a flexible tube using a peristaltic pump.

17. The method as defined in claim 14, wherein the step of introducing the globules into the liquid refrigerant includes disposing a feed tray over a chamber containing the liquid refrigerant, introducing the liquid composition into the feed tray, and allowing the liquid composition to fall by gravity through orifices is in the feed tray.

18. The method as defined in claim 17, wherein the step of disposing the feed tray over a chamber containing the liquid refrigerant further includes disposing the feed tray approximately 18 to 22 inches above a surface of the liquid refrigerant.

* * * * *